April 7, 1970  J. M. MOCHEL  3,505,108
TUNGSTEN BRONZE FILMS
Filed Oct. 19, 1966
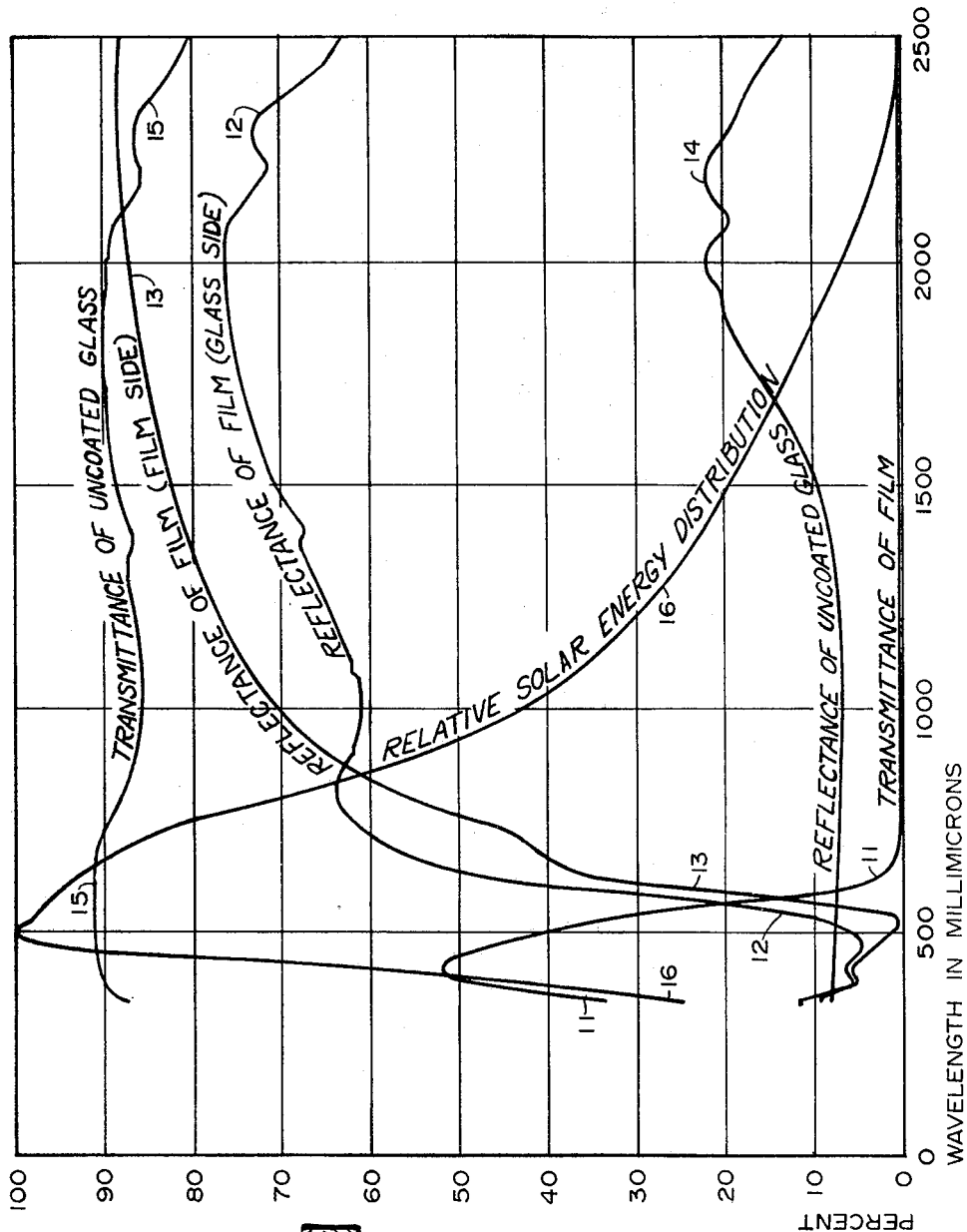
INVENTOR.
John M. Mochel
BY
Clarence Patty
ATTORNEY United States Patent Office 3,505,108
Patented Apr. 7, 1970

3,505,108
TUNGSTEN BRONZE FILMS
John M. Mochel, Painted Post, N.Y., assignor to Corning Glass Works, Corning, N.Y., a corporation of New York
Continuation-in-part of application Ser. No. 378,324, June 26, 1964. This application Oct. 19, 1966, Ser. No. 598,567
Int. Cl. C03c 17/00; C23c 3/00
U.S. Cl. 117—223                    10 Claims

ABSTRACT OF THE DISCLOSURE

This invention relates to the preparation of thin films of alkali metal tungsten-bronzes and to articles comprising a substrate material having a thin film of an alkali metal tungsten bronze deposited thereon.

---

This application is a continuation-in-part of my co-pending application, Ser. No. 378,324 filed June 26, 1964 now abandoned.

The alkali metal tungsten bronzes are non-stoichiometric compounds, characterized by the formula $M_xWO_3$ where M is an alkali metal and the value of $x$ is greater than 0 and less than 1.0. The range of values which $x$ may assume varies with the different alkali metals. Where M is either potassium or lithium, $x$ between 0 and 0.4. Where M is rubidium, $x$ may range between 0 to 0.3. For cesium, $x$ may be between 0 and 0.25. Typical of the tungsten bronzes is sodium tungsten bronze, $Na_xWO_3$ wherein $x$ may be any value from 0.2 to 0.96. The compositions rich in sodium are golden yellow by reflected light. As the ratio of sodium to tungsten decreases, the color varies from metallic yellow to red to blue.

The tungsten bronzes are neither alloys nor intermetallic compounds. The term "bronze" was originally applied to describe the yellow, metallic bronze-like luster of $Na_xWO_3$ where $x$ is about 0.8 or 0.9. However, the term is now applied generally to this type of composition regardless of color. For example $K_xWO_3$, where $x$ equals 0.4, is referred to as a potassium tungsten bronze, although the composition is red-violet by reflected light.

The tungsten bronzes were first reported by Wohler in the year 1824. Since that time, they have been studied by various investigators and have been the subject of a considerable number of technical publications. In spite of this apparent interest, no substantial commercial use has been made of these compounds. Furthermore, so far as I am aware, it has not heretofore been known to prepare these compounds in the form of a thin, continuous, polycrystalline film.

I have found that thin films of alkali-metal tungsten-bronze may be formed on a substrate material by applying to the substrate, a coating of a solution of a salt of an acid of tungsten and an inorganic compound of an alkali metal, the alkali metal and tungsten being present in an atomic ratio of less than 1.0 alkali metal to tungsten, and firing in a reducing atmosphere at a temperature in excess of about 400° C. Although higher temperatures may be employed, I have found that firing temperatures of between about 400° and 650° C. are generally suitable. While alkali metal compounds in general may be used in the coating solution, I have found the nitrates, nitrites, carbonates, hydroxides and tungstates particularly suitable. Compounds of sulfur or halogen may be used, but are generally less desirable since they tend to cause a haze in the final film. If organic materials are used, carbonaceous residues impart a haze to the final film. Such residues require an additional purifying step which is not necessary when strictly inorganic reaction materials are employed.

Suitable salts of the acids of tungsten include the ammonium or alkali metal metatungstates, orthotungstates and paratungstates. The salts may be added to an aqueous medium or may be formed in situ in the solution by reaction of an acid of tungsten with the appropriate cation. Orthotungstic, metatungstic or paratungstic acid may be used for this purpose. Orthotungstic acid is the most common commercial acid of tungsten, and is generally referred to simply as tungstic acid.

Orthotungstic acid will react readily with ammonium or alkali ions in aqueous solutions at a pH above about 8 to form the corresponding orthotungstate $(R_2WO_4 \cdot xH_2O)$ If the pH is maintained between about 4 and 8, a conversion to the paratungstate salt $(R_{10}W_{12}O_{41} \cdot xH_2O)$ occurs. At a pH of about 2 to 3, the metatungstate salt $(R_2W_4O_{13} \cdot xH_2O)$ is formed. At a pH below about 2, tungstic acid may precipitate from solution.

The polytungstates are large, complex molecules and as a result tend to be slow to crystallize. This tendency offers a particular advantage in the process of the present invention. The aqueous polytungstate coating solutions may be dried readily at temperatures over 100° C. to form a smooth amorphous film. At higher temperatures, in a reducing atmosphere, the amorphous film will crystallize to a tungsten bronze film which assumes the morphology of the intermediate amorphous film. Processes which do not favor the formation of an intermediate amorphous film tend to result in a final film which is rough and of uneven thickness.

Thin films of alkali metal tungsten bronzes prepared in this manner have relatively low electrical resistivities and can be used in various electrical applications such as the manufacture of resistors.

In addition, the films are highly reflective to infrared radiation and substantially transparent to visible light. Thin films of these compounds may be applied to transparent glass substrates to provide infrared filters and solar shields. They exhibit excellent resistance to weathering and are suitable for use as solar shields on window panes and the like.

The unique color characteristics of alkali metal tungsten bronze films may be used to advantage for decorative purposes. The films exhibit a pleasing blue color by transmitted light and various colors by reflected light, depending on composition.

The films are highly resistant to attack by acids and may be employed as protective coatings.

The thin films of the present invention are continuous, polycrystalline haze-free films. They exhibit an optical clarity and electrical uniformity unobtainable in particulate coatings such as would be formed by incorporating finely divided alkali metal tungsten bronze particles in an organic coating medium.

FIG. 1 is a graph showing the transmittance and reflectance of a radiation filter consisting of a tungsten bronze film about 1000 angstroms in thickness of the composition $Na_{.63}WO_3$, deposited on a ⅛ inch thick plate of Corning Code 7740 glass, a commercially available borosilicate glass. In the graph, curve 11 shows the transmittance of the filter. The reflectance from the glass side of the filter is shown by curve 12 and from the film side by curve 13. For purposes of comparison, the reflectance of the uncoated glass 14 and the transmittance of the uncoated glass 15, are shown. For purposes of illustration, the relative distribution of solar energy is shown by curve 16. The curve is a smoothed spectral energy distribution curve for solar radiation at noon in summer for Washington, D.C. From the curves shown, it will be apparent that a substantial portion of solar energy, particularly in the infrared, is reflected, while a substantial portion of visible light is permitted to pass.

FIG. 2 is a sectional view of an article comprising a transparent glass substrate 20, having deposited thereon, an alkali-metal tungsten bronze film 21 (greatly exaggerated in thickness). Such composite articles may be used for their electrical or optical properties. If the film is to be used for optical purposes, it is generally desirable to utilize a transparent substrate material, such as a transparent glass. However, if the film is to be used for purposes other than optical, the substrate material may be either transparent or non-transparent. For the manufacture of electrical resistance units, electrically insulating substrate materials are generally used. Suitable substrate materials include, for example, glass, glass-ceramic and ceramic materials. I have found that heat-resistant borosilicate glass such as Corning Code 7740 is particularly suitable as a substrate material.

The electrical and optical properties of the alkali metal tungsten bronzes ($M_xWO_3$) at constant values of $x$ are quite similar for the various identities of identities of M. However, considerable variation in properties is observed as a function of the value of $x$. At higher values of $x$, the bronzes exhibit metallic electrical conductivity. At lower values of $x$, the metallic properties disappear and the compounds are found to be semiconductors. When $x$ becomes small enough, the properties approach those of a dielectric.

The sodium tungsten bronzes offer certain advantages over the other alkali metal tungsten bronzes in the preparation of thin films. The initial coating solutions are more readily prepared for the sodium tungsten bronzes, since, in general, the sodium compounds employed are more soluble than the compounds of the other alkali metals. In addition, for the sodium tungsten bronzes, the values of $x$, i.e., amount of alkali metal, may vary over a wider range than for any of the other alkali metal tungsten bronzes. Since the properties of the properties of the compounds vary as a function of $x$, a wider range of properties is obtainable with the sodium tungsten bronzes.

The term "thin film" as used in the present specification and appended claims means a continuous polycrystalline film of less than about 5 microns in thickness of an alkali metal tungsten bronze.

The preparation of thin films of alkali metal tungsten bronzes is further illustrated by the following examples:

EXAMPLE 1

A lithium tungsten bronze film was prepared as follows: A mixture of 185.5 grams of ammonium metatungstate and 25.5 grams of lithium nitrate per liter of water was acidified with nitric acid to a pH of about 3.0. A portion of this solution was applied to a 2" x 2" x ⅛" plate of borosilicate glass, (Corning Code 7740), by spinning the glass plate at about 1000 r.p.m.; applying a small portion of the solution to the center of the spinning plate and allowing the solution to spread out by centrifugal force to form a uniform coating. The coated glass plate was then placed in a furnace in an atmosphere of 20% $H_2$ and 80% $N_2$, heated to about 600° C. over a period of about 2 hours, held at that temperature for about one hour and then cooled to room temperature. During the heating, the aqueous coating first dried to an amorphous film and then slowly crystallized to yield a smooth polycrystalline film. The composition of the fired film as calculated from the reaction mixture was $Li_{.5}WO_3$. The film appeared red to maroon by reflected light and blue by transmitted light.

EXAMPLE 2

A mixed lithium-sodium tungsten bronze film was prepared as follows: An aqueous solution of 185.5 gms. of ammonium metatungstate, 14.0 gms. of lithium nitrate and 14 gms. of sodium nitrite per liter of water was acidified with nitric acid to a pH of about 3.7. Following the procedure of Example 1, a portion of the solution was spread on a borosilicate glass plate and the coated plate fired in a reducing atmosphere. The resulting film, appeared deep red by reflected light and blue by transmitted light. The film had a calculated composition of $Li_{.3}Na_{.3}WO_3$.

EXAMPLE 3

A potassium tungsten bronze film having a calculated composition $K_{.63}WO_3$ was prepared in the following manner: A solution of 185.5 gms. of ammonium metatungstate and 29.0 gms. of potassium carbonate per liter of water was acidified with nitric acid to a pH of about 2.0 and applied to a plate of Corning Code 7740 glass and fired in the manner described in Example 1. The color of the final film was deep maroon by reflected light and blue by transmitted light.

EXAMPLE 4

A rubidium tungsten bronze film having a calculated composition of $Rb_{.5}WO_3$ was prepared as follows: 2.78 gms. of ammonium metatungstate were dissolved in 14 mls. of water. The pH was adjusted to about 9.5 by the addition of 1 ml. of concentrated $NH_4OH$. Next, 0.58 gram of rubidium carbonate were added and the resulting solution was applied to a plate of Corning Code 7740 glass and fired in the manner described in Example 1. The resulting rubidium tungsten bronze film appeared blue both by reflected light and transmitted light.

EXAMPLE 5

The procedure according to Example 4 was repeated with the exception that 0.81 gram of cesium carbonate was substituted for the rubidium carbonate. The final film, having a calculated composition of $Cs_{.5}WO_3$ appeared blue both by reflected light and transmitted light.

In Example 4 and 5, a basic solution was employed to increase the solubility of the rubidium and cesium carbonates.

A particularly advantageous method of preparing thin films of sodium tungsten bronze involves the use of an aqueous solution of sodium paratungstate. The stoichiometry of sodium paratungstate ($Na_{10}W_{12}O_{41} \cdot xH_2O$) is such that the resulting thin film will have the composition $Na_{.83}WO$. If it is desired to vary the ratio of Na to W, various amounts of an inorganic compound of tungsten may be added to the aqueous coating solution. Ammonium metatungstate may be conveniently used for this purpose.

The preparation of a thin film of sodium tungsten bronze, having the composition $Na_{.83}WO_3$, is described in Example 6, below.

EXAMPLE 6

An aqueous solution of sodium paratungstate (192 gms./liter) was acidified to a pH of about 2, addition of nitric acid. A portion of the solution was applied to a 2" x 2" borosilicate glass plate and centrifugally spread to a uniform coating by spinning the plate. The coated glass plate was placed in a furnace in an atmosphere of 20% $H_2$ and 80% $N_2$, heated to a temperature of 600° C. over a period of two hours and held at that temperature for an additional hour. The composition of the resulting film was $Na_{.83}WO_3$. The film appeared yellow-gold by reflected light and blue by transmitted light.

The preparation of thin films of sodium tungsten bronze having various ratios of Na to W is described in Examples 7–9, below.

EXAMPLES 7–9

A portion of the sodium paratungstate coating solution described in Example 6 was divided into 3 parts. The sodium to tungsten ratio of each solution was varied by the addition of ammonium metatungstate. The solutions were applied to glass plates and fired in the manner described in Example 6

COATING COMPOSITION

| | Sodium paratungstate (gms./liter of $H_2O$) | Ammonium metatungstate (gms./liter $H_2O$) |
|---|---|---|
| Example 7 | 170.0 | 22.0 |
| Example 8 | 144.5 | 44.2 |
| Example 9 | 123.0 | 67.4 |

| | | Color of final film | |
|---|---|---|---|
| | Final film composition | Reflected light | Transmitted light |
| Example 7 | $Na_{.73}WO_3$ | Orange yellow | Blue. |
| Example 8 | $Na_{.63}WO_3$ | Orange | Do. |
| Example 9 | $Na_{.53}WO_3$ | Red | Do. |

Particularly desirable films can be made by the addition of at least one acidic oxide chosen from the group consisting of $Al_2O_3$, $B_2O_3$, $P_2O_5$, $SiO_2$ or $TiO_2$ to the film, although as previously described, films can be made without the use of such oxides. These oxides were added to the films in the ratio of about one atom of acidic element to 12 atoms of tungsten and in any convenient form or manner. The acidic oxide apparently inhibits disproportionation of the $Na_xWO_3$, thereby yielding a more uniform film of very high quality and allowing more latitude in the choice of process temperature. Disproportionation as used herein means the simultaneous oxidation and reduction of a substance reacting with itself to form two dissimilar molecules $$(Na_xWO_3 \rightarrow WO_2 + Na_2WO_4)$$

The use of acidic oxides in the preparation of alkali metal tungsten bronze thin films is further illustrated by the following examples:

EXAMPLE 10

An aqueous solution of aluminum nitrate, ammonium metatungstate and sodium paratungstate was acidified to a pH of about 2.0, by the addition of nitric acid. A portion of the solution was applied to a 3″ x 3″ borosilicate glass plate and centrifugally spread to a uniform coating by spinning the plate and dried to a clear amorphous film. The coated glass plate was placed in a furnace in an atmosphere of 20% $H_2$ and 80% $N_2$, heated to a temperature of 600° C. over a period of two hours and held at that temperature for an additional hour. The composition of the resulting film was $Na_{.63}Al_{.083}WO_3$. The film appeared reddish bronze by reflected light and blue by transmitted light.

EXAMPLE 11

An aqueous solution of ammonium metatungstate, sodium tungstate dihydrate and sodium tetraborate was acidified to a pH of about 3, by the addition of nitric acid. A portion of the solution was applied to a 2″ x 2″ borosilicate glass plate and centrifugally spread to a uniform coating by spinning the plate and dried to a clear amorphous film. The coated glass plate was placed in an atmosphere of 20% $H_2$ and 80% $N_2$, heated to a temperature of 600° C. over a period of two hours and held at that temperature for an additional hour and one half. The composition of the resulting film was $$Na_{.63}B_{.083}WO_3$$

The film appeared reddish bronze by reflected light and blue by transmitted light.

EXAMPLE 12

A solution of phosphotungstic acid, sodium bicarbonate sodium nitrite, and water was made which had a pH of about 4.0. A portion of the solution was applied to a 3″ x 3¾″ borosilicate glass plate and centrifugally spread to a uniform coating by spinning the plate and drying to a clear amorphous film. The coated glass plate was placed in a furnace in an atmosphere of 20% $H_2$ and 80% $N_2$, heated to a temperature of 550° C. over a period of two hours and held at that temperature for an additional hour and a quarter. The composition of the resulting film was $Na_{.96}P_{.083}WO_3$. The film appeared yellow by reflected light and blue by transmitted light.

EXAMPLE 13

An aqueous solution of silicotungstic acid and sodium bicarbonate was acidified to a pH of about 6, by addition of nitric acid. A portion of the solution was applied to a 2″ x 2″ borosilicate glass plate and centrifugally spread to a uniform coating by spinning the plate and drying to a clear amorphous film. The coated glass plate was placed in a furnace in an atmosphere of 20% $H_2$ and 80% $N_2$, heated to a temperature of 550° C. over a period of two hours and held at that temperature for an additional hour. The composition of the resulting film was $Na_{.96}Si_{.083}WO_3$. The film appeared golden yellow by reflected light and blue by transmitted light.

EXAMPLE 14

An aqueous solution of tetraisopropyl titanate and sodium paratungstate was acidified to a pH of about 3.5, by the addition of nitric acid. A portion of the solution was applied to a 3″ x 3″ borosilicate glass plate and centrifugally spread to a uniform coating by spinning the plate and drying to a clear amorphous film. The coated glass plate was placed in a furnace in an atmosphere of 20% $H_2$ and 80% $N_2$, heated to a temperature of 550° C. over a period of two hours and held at that temperature for an additional hour. The composition of the final film was $Na_{.75}Ti_{.083}WO_3$. The film appeared yellow bronze by reflected light and blue by transmitted light.

The initial aqueous coating may be applied to the substrate by various methods, such as spinning, brushing, rolling, etc. Care should be exercised to spread the coating evenly over the substrate since the uniformity of the initial aqueous coating will effect the uniformity of the final film.

The morphology of the final film is dependent not only on the uniformity of the initial aqueous coating but also on the manner in which the aqueous coating is dried. In the above examples, the initial aqueous coating was heated to about 600° C. over a period of 1 to 2 hours. During this heating period, the aqueous coating first dried to a thin, smooth amorphous film. As the heating progressed, the material crystallized to form a polycrystalline film which assumed the morphology of the amorphous film. The formation of a dry, amorphous film, prior to final crystallization is particularly desirable. If crystallization takes place without the prior formation of a dry amorphous film, a hazy, uneven film may result. Care should be taken to avoid nucleation from foreign particles, dust, etc. during the drying step, to minimize the possibility of premature crystallization.

I claim:

1. An article of manufacture comprising a substrate having adhered to and extending over at least a portion of the surface thereof, a thin, continuous, polycrystalline film consisting essentially of an alkali metal tungsten bronze.

2. An article according to claim 1 wherein the atomic ratio of alkali metal to tungsten is greater than 0 but less than 1.

3. An article of manufacture comprising a substrate having adhered to and extending over at least a portion of the surface thereof, a thin, continuous, polycrystalline film consisting of an alkali metal tungsten bronze and at least one acidic oxide chosen from the group consisting of $Al_2O_3$, $B_2O_3$, $P_2O_5$, $SiO_2$, and $TiO_2$.

4. An article according to claim 3 wherein the atomic ratio of the acidic element to tungsten is about 1:12.

5. An article according to claim 4 wherein the atomic ratio of alkali metal to tungsten is greater than 0 but less than 1.

6. A method of forming a thin film of alkali metal tungsten bronze which comprises:
(A) applying to a substrate a coating of an aqueous solution of:
(i) at least one compound selected from the group consisting of ammonium metatungstate, ammonium orthotungstate, ammonium paratungstate, alkali metal metatungstate, alkali metal orthotungstate, and alkali metal paratungstate; and
(ii) at least one compound selected from the group consisting of alkali metal nitrates, alkali metal nitrites, alkali metal carbonates, alkali metal hydroxides, alkali metal tungstates, alkali metal halides, and sulfur containing alkali metal compounds; and
(B) drying the coating to an amorphous film and firing in a reducing atmosphere at a temperature in excess of 400° C.

7. A method according to claim 6 wherein the atomic ratio of the alkali metal to tungsten is greater than 0 but less than 1.

8. A method according to claim 6 wherein said thin film also contains at least one acidic oxide selected from the group consisting of $Al_2O_3$, $B_2O_3$, $P_2O_5$, $SiO_2$, and $TiO_2$.

9. A method according to claim 8 wherein the atomic ratio of acidic element to tungsten is about 1:12.

10. A method according to claim 9 wherein the atomic ratio of the alkali metal to tungsten is greater than 0 but less than 1.

References Cited

UNITED STATES PATENTS

| | | | |
|---|---|---|---|
| 2,704,420 | 3/1955 | Ohlinger | 65—37 |
| 2,952,575 | 9/1960 | Baltzer | 117—333 X |

OTHER REFERENCES

Mellor: Comprehensive Treatise on Inorganic & Theoretical Chemistry, vol. 11, 1931, pp. 750, 751 and 752 relied upon.

ANDREW GOLIAN, Primary Examiner

U.S. Cl. X.R.

117—33.3, 101, 121, 124, 211